(12) United States Patent
Wheatley et al.

(10) Patent No.: US 10,843,819 B2
(45) Date of Patent: Nov. 24, 2020

(54) RECHARGING NETWORK FOR DRONES

(71) Applicant: ENVISION SOLAR INTERNATIONAL, INC., San Diego, CA (US)

(72) Inventors: Desmond Wheatley, Rancho Santa Fe, CA (US); Patrick Senatore, San Diego, CA (US)

(73) Assignee: BEAM GLOBAL, San Diego, CA (US)

( * ) Notice: Subject to any disclaimer, the term of this patent is extended or adjusted under 35 U.S.C. 154(b) by 128 days.

(21) Appl. No.: 16/044,044

(22) Filed: Jul. 24, 2018

(65) Prior Publication Data

US 2020/0031497 A1  Jan. 30, 2020

(51) Int. Cl.
| | |
|---|---|
| *B64F 1/36* | (2017.01) |
| *B64C 39/02* | (2006.01) |
| *G05D 1/00* | (2006.01) |
| *B63B 35/50* | (2006.01) |
| *B60L 53/14* | (2019.01) |
| *B60L 53/60* | (2019.01) |

(52) U.S. Cl.
CPC .............. *B64F 1/362* (2013.01); *B60L 53/14* (2019.02); *B60L 53/60* (2019.02); *B63B 35/50* (2013.01); *B64C 39/024* (2013.01); *G05D 1/0011* (2013.01); *B60L 2200/10* (2013.01); *B60L 2230/22* (2013.01); *B60L 2230/24* (2013.01); *B64C 2201/024* (2013.01); *B64C 2201/042* (2013.01)

(58) Field of Classification Search
CPC .......... B64F 1/362; B60L 53/60; B60L 53/14; B60L 2200/10; B60L 2230/22; B60L 2230/24; B63B 35/50; B64C 39/024; B64C 2201/024; B64C 2201/042; G05D 1/0011
See application file for complete search history.

(56) References Cited

U.S. PATENT DOCUMENTS

| 8,862,288 | B2 | 10/2014 | Vavrina et al. | |
|---|---|---|---|---|
| 9,044,543 | B2 | 6/2015 | Levien | |
| 9,061,102 | B2 | 6/2015 | Levien | |
| 10,013,611 | B2 | 7/2018 | Barrier | |
| 2013/0081245 | A1* | 4/2013 | Vavrina | B60L 53/51 29/402.08 |

(Continued)

OTHER PUBLICATIONS

PCT/US2019/34193, Notification of Transmittal of the International Search Report and the Written Opinion of the International Searching Authority, or the Declaration.

*Primary Examiner* — Aaron L Troost
(74) *Attorney, Agent, or Firm* — Nydegger & Associates

(57) ABSTRACT

A network is provided for recharging aerial drones during extended flight operations, without requiring a return to a centralized recharging station. Instead, autonomous recharging stations are provided which are self-sustained by using electricity from renewable energy sources located at the station. Operationally, a cone-shaped receptacle is mounted on the drone, and a cone-shaped probe is provided at the recharging station. The probe is connected with the renewable energy source. With this connection, an engagement for recharging the drone's battery is accomplished when the vertex of the probe is received through the open base of the receptacle to place an electrical connector on the probe in contact with the battery of the drone.

16 Claims, 2 Drawing Sheets

(56) References Cited

U.S. PATENT DOCUMENTS

| | | |
|---|---|---|
| 2014/0081479 A1 | 3/2014 | Vian |
| 2014/0083937 A1 | 3/2014 | Hsu |
| 2014/0229392 A1 | 8/2014 | Hsu |
| 2016/0257424 A1* | 9/2016 | Stabler ................. G05D 1/0676 |
| 2017/0088288 A1* | 3/2017 | Wang ...................... B60L 53/00 |
| 2017/0158353 A1 | 6/2017 | Schmick |
| 2017/0225574 A1* | 8/2017 | Thelen .................... H02J 7/025 |
| 2018/0024571 A1* | 1/2018 | Peasgood ................ B64C 19/00 |
| | | 244/7 C |
| 2018/0118045 A1* | 5/2018 | Gruzen ................... B60L 55/00 |
| 2019/0100331 A1* | 4/2019 | Wright ...................... B64F 1/22 |

\* cited by examiner

RECHARGING NETWORK FOR DRONES

FIELD OF THE INVENTION

The present invention pertains generally to systems and methods for recharging battery-powered aerial drones. More specifically, the present invention pertains to systems and methods which extend the operational mission capability of an aerial drone beyond the flight endurance capability of its battery. The present invention is particularly, but not exclusively, useful as a network of autonomous recharging stations that are each self-sustaining with its own renewable energy source, and which are separately deployed to allow for recharging the batteries of aerial drones during their long range and/or repeated flight operations within an extended operational area, without returning to a centralized recharging station.

BACKGROUND OF THE INVENTION

Battery-powered vehicles are becoming more commonplace every day. In particular, aerial drones have become the focus of increasing interest for many different vocational uses. One such use involves the employment of aerial drones for the transport and delivery of cargo.

Along with the potential for using battery-powered aerial drones as cargo transport vehicles there are still concerns that need to be addressed to make this capability an effective commercial viability. These concerns include the facts that batteries for aerial drones need to be as light weight as possible, and they need optimal long-range, operational endurance. Indeed, battery endurance is a key consideration for determining the lift and transport capabilities of an aerial drone.

For long-haul cargo transport, a solution to the problems involved with recharging an aerial drone are somewhat similar to the refueling issues encountered by ground transport vehicles. Namely, like trucks and trains that require refueling, aerial drones need to have appropriate access to a network of recharging stations. It happens, however, that to be effective, recharging stations employed in a network for recharging aerial drones may be needed at inconvenient locations where a source of electricity is not be readily or easily available.

In light of the above, it is an object of the present invention to provide a network of autonomous recharging stations that are individually self-sustaining, with each recharging station having its own renewable energy source. Another object of the present invention is to provide a network of autonomous recharging stations that are separately deployed to allow for recharging the batteries of aerial drones during long range and/or repeated flight operations. Still another object of the present invention is to provide a system/method for operating a battery-powered aerial drone for long-range and extended endurance operational missions which is simple to install, easy to use and comparatively cost effective.

SUMMARY OF THE INVENTION

A network for operating a battery-powered aerial drone in accordance with the present invention includes a plurality of autonomous recharging stations. For the present invention, the recharging stations are separately located at predetermined sites which are dispersed throughout an operational area. Importantly, each recharging station is located within a distance from at least one other recharging station that is less than the flight range of aerial drones using the network.

As envisioned for the present invention, each recharging station will include a probe that is installed at its site, together with an electricity supply source and a transmitter. Operationally, the electricity supply source is linked with an electrical connector on the probe which will establish electrical contact between the electricity supply source and the battery of an aerial drone when the probe is engaged with the drone. After the drone's battery has been recharged, the drone then disengages from the probe and continues on its mission with a fully charged battery. Preferably, the electricity supply source at the recharging station will be a solar panel that includes a plurality of photovoltaic cells. Further, as envisioned by the present invention, the solar panel can be supplemented by a wind turbine. In this combination, like the solar panel, the wind turbine can be connected to the electrical connector of the probe for recharging the battery of the drone.

For the present invention, the mechanism for engaging an aerial drone with the probe at a recharging station involves a cone-shaped receptacle mounted on the drone, and a cone-shaped probe located at the recharging station. In detail, the receptacle on the drone is envisioned to be a hollow, cone-shaped structure having a base and an open vertex. When mounted on the drone, the open vertex of the cone-shaped receptacle is positioned to establish an access pathway to the battery through the base of the cone. Structurally, the cone-shaped probe is complementary to the cone-shaped receptacle on the drone. Thus, electrical contact can be established between the electricity supply source and the battery of the drone when the probe is engaged with (i.e. received into) the receptacle of drone.

An operation of the network system requires establishing a base station where a system controller can be located. Specifically, the controller at the base station will control the flight operation of the aerial drone, and it will also monitor the charging capacity of the individual electricity sources at the various recharging stations in the network system. To do this, the controller uses a transceiver at the base station that is connected in communication with a transceiver on the drone. This transceiver is also connected in communication with a plurality of transmitters that are each respectively located at a recharging station in the network. Within this communications net, the controller can receive flight information from the drone and operational information from the recharging stations. In particular, the flight information data that is received from the aerial drone is used to fly the drone, and to also inform the base station of the drone's remaining battery charge. On the other hand, operational data from the recharging station will include information regarding the present recharging capacity of the electricity supply source and information concerning whether another aerial drone is currently being recharged. Additionally, the operational information will include an elevation and a GPS location for each recharging station.

Also, within the capabilities of the network system, a drone can always communicate directly with a recharging station. The recharging station can then gather flight information from the drone for retransmission of this flight information to a Network Operating Center (NOC). Moreover, a drone can also communicate directly with the NOC, or directly with a base station. In any event, information from a drone can be collected and appropriately used by the network system.

For an extended application of the present invention, it is envisioned that recharging stations can be located offshore at maritime sites for incorporation into the network system. In particular, when employed at a maritime site, the recharging station will require a platform that is somehow stabilized to establish a substantially stationary location for the recharging station. For example, the platform can be stabilized by any means well known in the pertinent art for this purpose, such as a tower, an anchor or a plurality of GPS controlled micro thrusters. In all important aspects, the recharging station at the maritime site will be essentially similar to the land-based recharging stations disclosed herein.

As envisioned for the present invention several aerial drones can be simultaneously operated in the network system. Accordingly, the recharging station can be constructed to include a plurality of probes which are mounted in an array. The recharging station is thus capable of simultaneously accommodating a same plurality of aerial drones as there are probes in the array at the recharging station.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
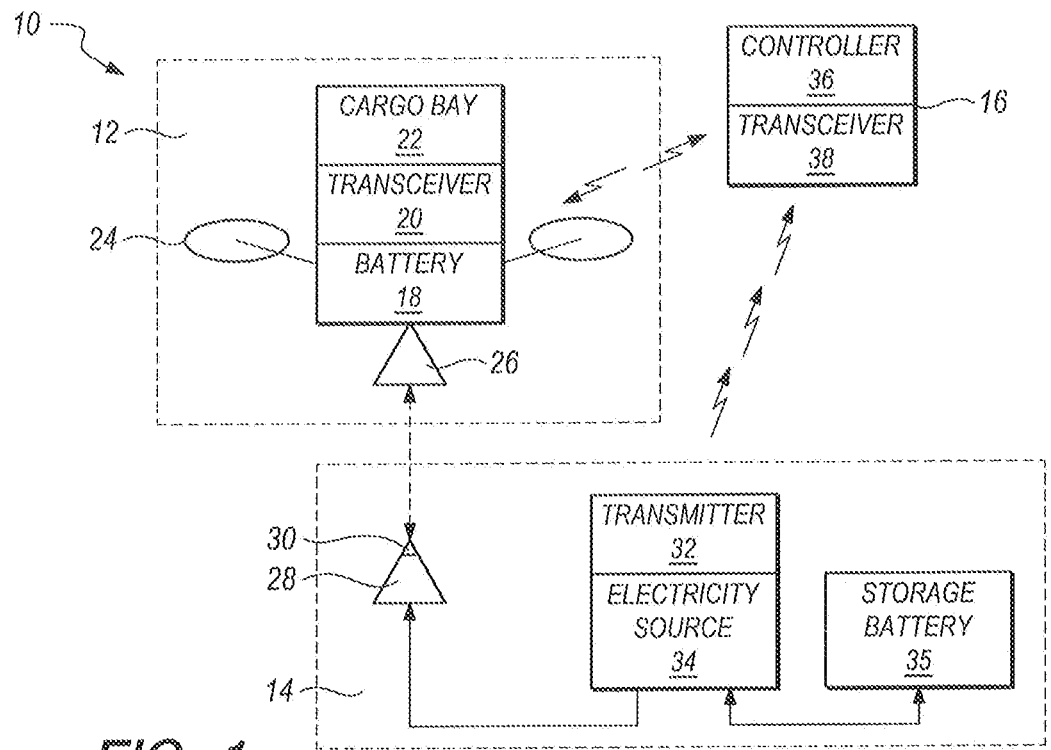
FIG. 1 is a functional schematic of the essential components in a network system for recharging aerial drones in accordance with the present invention.

Referring initially to FIG. 1, a network for controlling a cargo transport and delivery system in accordance with the present invention is shown and is generally designated 10. As shown, the network 10 includes a rotary-wing aerial drone 12 of a type well known in the pertinent art. Also shown as components of the network 10 are a recharging station 14 and a base station 16. As envisioned for the present invention, the network 10 can accommodate a plurality of aerial drones 12 and it can include many recharging stations 14, such as the exemplary recharging stations 14a-d shown in FIG. 2. Further, although not shown, the network 10 can also accommodate a plurality of base stations 16 wherein each base station 16 will be used to control a particular aerial drone 12.

With reference to FIG. 1, it will be seen that an aerial drone 12 will include a battery 18, and a transceiver 20. The drone 12 will also include a cargo bay 22 where items that are to be transported by the drone 12 can be secured during a flight operation. Further, depending on the design of a particular drone 12, the drone 12 will have at least one rotor 24, but most likely a plurality of rotors 24. Also, though not shown, it is envisioned that structures can be incorporated with the drone 12 which, in lieu of or in addition to the cargo bay 22, can be incorporated into the design of an aerial drone 12 to increase payload (e.g. a sling-load capability). In any event, for purposes of the present invention, an important structure for the drone 12 is a receptacle 26.

As shown in FIG. 1 the receptacle 26 is a cone-shaped structure which defines a base and a vertex. Importantly, the receptacle 26 is a hollow cone with an open base and an open vertex. For purposes of the present invention, the receptacle 26 is mounted on the drone 12 with its open vertex positioned to establish an access pathway through the cone-shaped receptacle 26 to the battery 18. As will be appreciated by the skilled artisan, the receptacle 26 can be either factory installed or retro-fitted. Accordingly, the receptacle 26 need not be specific for a particular type of aerial drone 12.

Still referring to FIG. 1, the recharging station 14 is shown to include a cone-shaped probe 28. Specifically, the probe 28 is shaped to be complementary with the cone-shaped receptacle 26. With these similar cone-shaped structures the probe 28 at the recharging station 14 can be received into the cone-shaped receptacle 26 on the drone 12 for a recharging operation. As envisioned for the present invention, the electrical connection between the cone-shaped probe 28 and the cone-shaped receptacle 26 may be either conductive or inductive.

Structurally, the probe 28 includes an electrical connector 30 which is positioned at the vertex of the probe 28. Further, the recharging station 14 includes an electricity supply source 34 which is linked with the electrical connector 30 of the probe 28 for recharging the battery 18 of the drone 12 when the probe 28 is received into the receptacle 26 on the drone 12. Preferably, the electricity supply source 34 will be a renewable source of energy, such as a solar array or a wind turbine. In any case, the electricity supply source 34 is envisioned as being self-sustaining so the recharging station 14 will be essentially autonomous.

It is also shown in FIG. 1 that the recharging station 14 is provided with a transmitter 32. Additionally, the recharging station 14 will typically include a storage battery 35 which will store excess energy from the renewable source of energy, as needed. It may also include at least one dummy probe (not shown) that is electrically inert and functions as a waiting location where a drone 12 can remain under minimal power requirements until an active probe 28 is available for a recharging operation.

As mentioned above, the network 10 of the present invention includes at least one base station 16. For the present invention, the base station 16 will include a controller 36 and a transceiver 38. In particular, for an operation of the network 10, the transceiver 38 at the base station 16 will be in communication with the transceiver 20 on the aerial drone 12, and with the transmitter 32 at each recharging station 14. More specifically, the transceiver 36 which is located at the base station 16 will receive flight information data from the aerial drone 12 that includes the information and data necessary to fly the drone 12 (e.g. air speed, altitude, heading and remaining battery charge). The transceiver 38 will also receive operational information from each recharging station 14. In particular, this operational information will include information regarding the present recharging capacity of the electricity supply source 34, and information concerning whether another aerial drone 14 is currently being recharged at the recharging station 14. With this in mind, it is also to be appreciated that prior to an operational mission, the base station 16 will be provided with information regarding the elevation and GPS location for each autonomous recharging station 14 within the operational area 40 of the drone 12 (see FIG. 2).

In addition to the components for the network 10 disclosed above, the present invention also envisions other ancillary considerations. For one, an anchor (not shown)

may be needed to stabilize the probe 28 at the autonomous recharging station 14. For another, it is also envisioned that the recharging station 14 can include a plurality of probes 28, which will be mounted in an array for simultaneously accommodating a same plurality of aerial drones 12 during a recharging operation. Additionally, the recharging station 14 will be protected by appropriate security measures that provide electronic/audio warnings when equipment at the recharging station 14 is being vandalized or tampered with.

Figure 2:
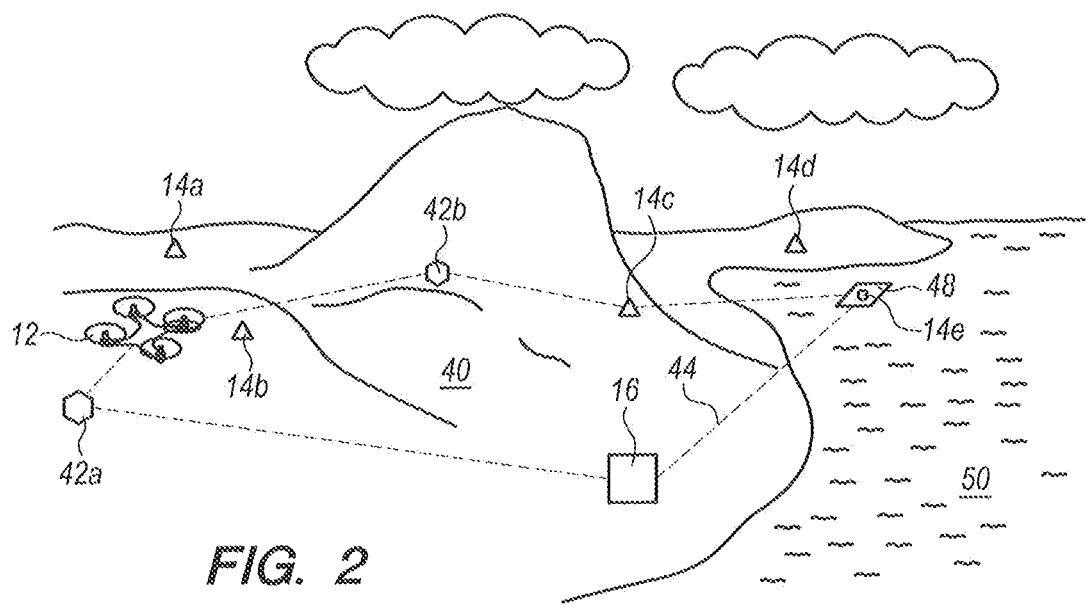
FIG. 2 is a representative view of an extended operational area with components of the present invention deployed for aerial drone flight operations.

In an operation of the network 10, a base station 16 is established at any convenient location where it will be able to control the flight mission of a drone 12. As envisioned for the present invention, the mission will be pre-planned and it will be confined within a predetermined operational area 40. Specifically, the operational area 40 will be determined by the locations of various drop-off points 42*a-c* where cargo deliveries are scheduled. For example, FIG. 2 shows a planned flight path 44 (dashed line) that is required for delivering cargo by the drone 12 to drop-off points 42*a-c*. Further, for disclosure purposes, it is to be considered that the planned route for flight path 44 exceeds the operational range of the drone 12.

For the exemplary mission mentioned above, an aerial drone 12 is loaded with cargo. Preferably, this will be done at the base station 16 but loading could be conducted elsewhere. In any event, the drone 12 then departs base station 16 and flies to the first drop-off point 42*a* where cargo can be removed from the drone 12 and/or it can be loaded with previously-approved, additional cargo. The drone 12 then flies on to a second drop-off point 42*b* where it again delivers and/or takes on cargo. In this example, after leaving drop-off point 42*b* the controller 36 at base station 16 is notified that the charge on battery 18 of drone 12 is low and requires recharging. Accordingly, drone 12 is landed at the recharging station 14*c*.

At the recharging station 14*c*, using guidance and control techniques well known in the pertinent art, the drone 12 is brought to a hover over the probe 28 at recharging station 14*c*. The drone 12 is then lowered onto the probe 28 as the cone-shaped probe 28 is received into the cone-shaped receptacle 26 of the drone 12. When the drone 12 has settled onto the probe 28, the electrical connector 30 on the probe 28 makes contact with the battery 18 of drone 12. Once the battery 18 has been recharged, drone 12 rises to a hover over the probe 28 and takes off to complete its mission along the flight path 44. As shown for the exemplary mission, drone 12 makes an additional stop at the drop-off point 42*c* before returning to the base station 16. The drone 12 can then be reloaded and sent on another mission.

An added feature for the present invention is the incorporation of a Network Operating Center (NOC) 46. In overview, the NOC 46 is incorporated to establish communication with all of the recharging stations 14 (*a-d*), with the base station 16 and with any drone 12 within the operational area 40. Also, the NOC 46 can be selectively connected with a drone 12' from outside the operational area 40. The NOC 46 can also be connected with other base stations 16' in other operational areas (not shown).

In its operation, the NOC 46 maintains up-to-date/real time information on the condition and availability of each autonomous recharging station 14 in the operational area 40. It also maintains operational data from the autonomous recharging stations 14 regarding the present recharging capacity of its electricity supply source 34, and information concerning whether an aerial drone(s) 12 is (are) currently being recharged at a particular recharging station 14. Further, the NOC 46 maintains a schedule for each recharging station 14 in the operational area 40. Specifically, the schedule will include pre-planned charge and charging times at the respective recharging station 14, together with its available, excess recharging capacity.

Figure 3:
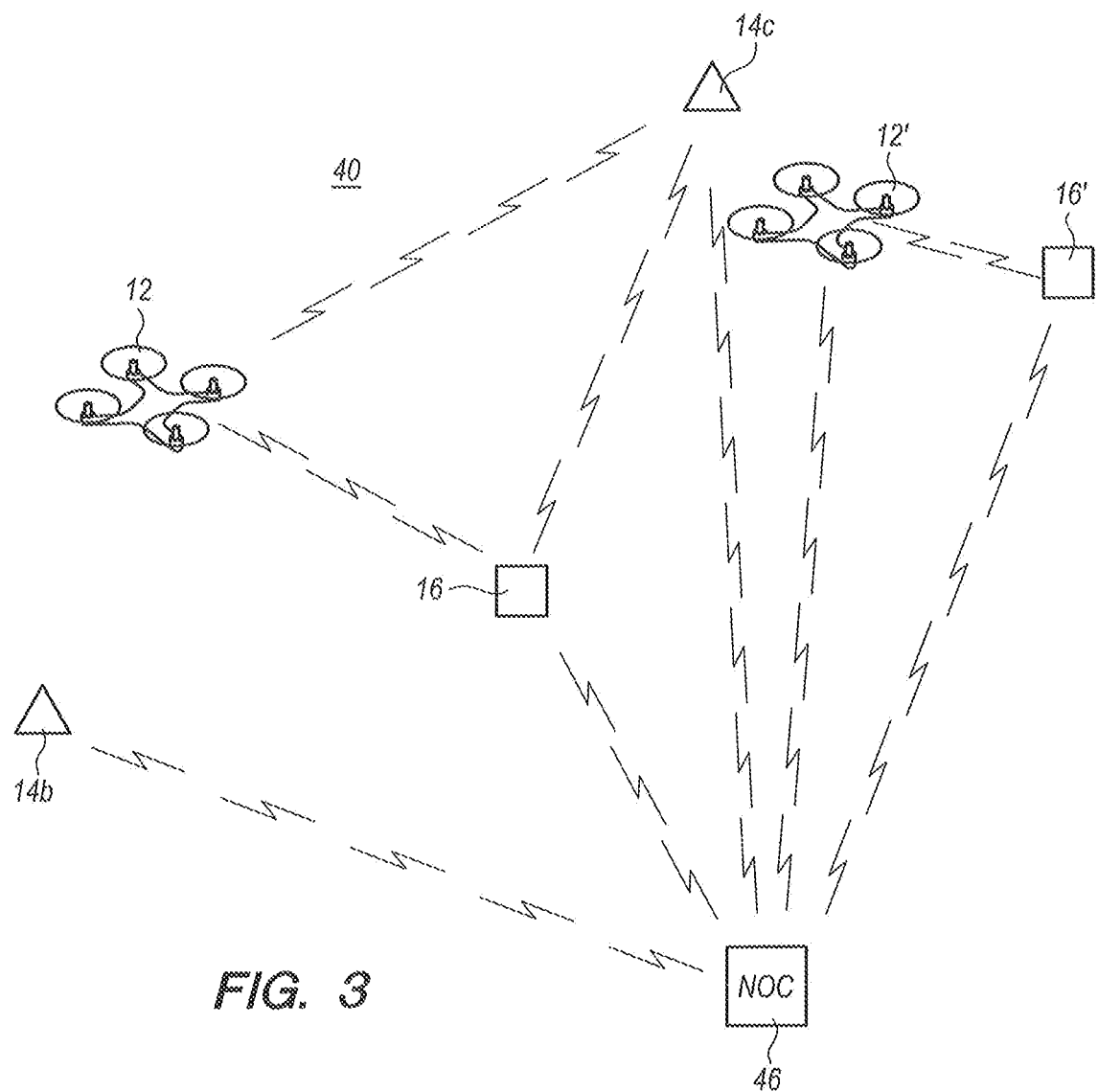
FIG. 3 is a schematic presentation of an operational area showing the communications links established between a Network Operating Center (NOC) and drones, recharging centers, and base stations in the operational area.

The schematic presentation of the communication connections used in an operation of the network 10 for the present invention, shown in FIG. 3, will be best appreciated with reference to its intended environment shown in FIG. 2. With reference to both FIGS. 2 and 3, it will be seen that to accomplish its functions noted above, the NOC 46 is connected with drone(s) 12, recharging stations 14 (*a-d*) and base station 16 in the operational area 40. Further, it will be seen that drone(s) 12 can communicate directly with a recharging station 14. It will also be seen that the NOC 46 can be in communication contact with a drone 12' that enters the operational area 40 but which is under the operational control of a separate base station 16' that has its own operational area 40' (not identified). The implication here is that the operational areas 40 and 40' may overlap each other.

Still referring to FIG. 3, it is to be appreciated that for a typical operation of the network 10, a drone 12 will be in communication with both a recharging station 14 (e.g. recharging station 14*c*) and its base station 16. Through these connections the drone 12 can obtain all of the information necessary for its use of the recharging station 14*c*.

On the other hand, a drone 12' that is being operated by a separate base station 16', but which is riot in direct communication with the recharging station 14*c*, will also be able to obtain this same information. In particular, the drone 12' can receive information about the recharging station 14*c* from its base station 16', if the base station 16' is in contact with the NOC 46, Otherwise, if it is not in contact with its base station 16', the drone 12' can receive the information directly from the NOC 46.

In any event, the purpose of the NOC 46 is to serve as a point of information for the operation of recharging stations 14 within one or more areas of operation 40. For this purpose, the NOC 46 maintains information about the availability and capacity of each recharging station 14. On the other hand, the NOC 46 also maintains contact with each drone 12 or 12' regarding its whereabouts, operational state of health, temperature, weight, battery condition and flight endurance. Stated differently, the NOC 46 is provided to consolidate this information in order to simultaneously monitor the overall operation of drones 12 and recharging stations 14 in one or more areas of operation 40.

As shown in FIG. 2, another embodiment of the present invention is envisioned wherein a recharging station 14*e* can be located offshore on a platform 48 at a maritime site above the surface of a body of water, such as the sea 50. In all essential particulars, the recharging station 14*e* will be operationally and functionally incorporated into the network system 10 in the same manner disclosed above for the recharging stations 14*a-d*. When employed at a maritime site, however, the recharging station 14*e* will necessarily require stabilization to establish a substantially stationary condition for the recharging station. This can be accomplished by any of several devices, all well known in the pertinent art. For example, the platform 48 can be stabilized on a tower (not shown), it can be somehow anchored in position, or the recharging station 14*e* can include a plurality of GPS controlled micro thrusters. Thus, an aerial drone 12 operating from the recharging station 14*e* will be able to extend the operational area 40 to drop off points 42 on various locations (i.e. ships) on the sea 50.

While the particular Recharging Network for Drones as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A network system for operating a battery-powered aerial drone in an operational area which comprises:
   an aerial drone having at least one rotor assembly and a battery for driving the rotor assembly;
   a hollow, cone-shaped receptacle having an open base and an open vertex, wherein the receptacle is mounted on the drone with its open vertex positioned to establish an access pathway to the battery through the open base of the cone-shaped receptacle;
   a cone-shaped probe having a vertex and a base, wherein the probe is located at a predetermined terrestrial site in the operational area and is vertically oriented at the site with its vertex above the base of the cone-shaped probe, and further wherein the probe includes an electrical connector positioned at the vertex of the probe;
   an electricity supply source linked with the electrical connector of the probe for recharging the battery of the drone when the probe is received into the receptacle on the drone to establish electrical contact between the supply source and the battery of the drone, wherein the probe and the electricity supply source are located together at the predetermined terrestrial site to establish an autonomous recharging station, and wherein the autonomous recharging station includes a transceiver for transmitting operational data to the base station;
   an anchor to stabilize the probe at the autonomous recharging station;
   a base station for controlling a flight operation of the drone; and
   a centralized Network Operating Center (NOC) for transmitting and receiving oversight information in real time, pertinent to drone operations within the network system, wherein the NOC is in communication with all recharging stations within the operational area, and is selectively connected with any drone and any base station inside/outside the operational area wherein the NOC maintains up-to-date/real time information on flight information from drones, to include operational state of health, weight, battery and flight endurance, and on the condition and availability of each autonomous recharging station in the operational area, together with operational data from the autonomous recharging station regarding the present recharging capacity of the electricity supply source and information concerning whether an aerial drone is currently being recharged.

2. The network system of claim 1 wherein the electricity supply source comprises:
   a solar panel including a plurality of photovoltaic cells;
   a wind turbine; and
   a storage battery for collecting excess electricity from the solar panel and the wind turbine.

3. The network system of claim 1, further comprising:
   a transceiver mounted on the aerial drone;
   a transceiver located at the base station for receiving flight information data from the aerial drone; and
   a controller located at the base station for using the flight information data to fly the aerial drone.

4. The network system of claim 1 wherein the NOC maintains a schedule for recharging stations in the operational area, wherein the schedule includes pre-planned charge and charging times together with available excess recharging capacity for each recharging station, wherein an elevation and a OPS location are established for each autonomous recharging station, and wherein the recharging station includes a plurality of probes mounted in an array for simultaneously accommodating a same plurality of aerial drones.

5. The network system of claim 1 wherein the operational area includes a body of water and the network system further comprises a platform positioned at a maritime site on the body of water, wherein the autonomous recharging station is established on the platform, and wherein the autonomous recharging station on the platform includes a transceiver for transmitting operational data to the base station.

6. The network system of claim 5 further comprising a means for stabilizing the platform at the maritime site, wherein the stabilizing means is selected from the group consisting of a tower, an anchor and a plurality of GPS controlled micro thrusters.

7. A network system for operating a battery-powered aerial drone which comprises:
   an aerial drone with a battery and a transceiver;
   a plurality of autonomous recharging stations wherein at least one autonomous recharging station is separately located at a predetermined terrestrial site and includes a probe installed at the site together with an electricity supply source and a transmitter, and with an anchor to stabilize the probe at the autonomous recharging, station, wherein the electricity supply source is linked with an electrical connector on the probe to establish electrical contact between the electricity supply source and the battery of the drone when the probe is engaged with the drone, to recharge the battery of the drone;
   a base station with a controller having a transceiver for receiving flight information from the aerial drone and operational information from the autonomous recharging station, wherein the flight information data is used for flying the aerial drone, and the operational data includes information regarding the present recharging capacity of the electricity supply source and information concerning whether another aerial drone is currently being recharged; and
   a Network Operating Center (NOC) for transmitting and receiving oversight information in real time, pertinent to drone operations within the network system, wherein the NOC is connected in communication with the aerial drone, wherein the NOC is also in communication with all recharging stations within the operational area, and is selectively connected with any drone and any base station inside/outside the operational area to provide overall control of the network system, and wherein the NOC maintains up-to-date/real time information on flight information from drones, to include operational state of health, weight, battery and flight endurance, and on the condition and availability of each autonomous recharging station in the operational area, together with operational data from the autonomous recharging station regarding the present recharging capacity of the electricity supply source and information concerning whether an aerial drone is currently being recharged.

8. The network system of claim 7 further comprising:
   a hollow, cone-shaped receptacle having an open base and an open vertex, wherein the receptacle is mounted on the drone with its open vertex positioned to establish an access pathway to the battery through the open base of the cone-shaped receptacle; and a cone-shaped probe wherein the vertex of the probe is above its base when the probe is vertically oriented at the site, and further wherein the probe includes an electrical connector positioned at its vertex to establish electrical contact between the electricity supply source and the battery of the drone when the probe is engaged with the receptacle of the drone.

9. The network system of claim 7 wherein the electricity supply source is selected from the group consisting of a solar panel and a wind turbine and wherein each autonomous recharging station is identified with an elevation and a GPS location.

10. The network system of claim 7 further comprising an array having a plurality of active probes and at least one dummy probe, wherein the active probes are positioned in the array for simultaneously recharging a same plurality of aerial drones, and the at least one dummy probe is positioned to provide a waiting point for a drone in queue for recharging.

11. The network system of claim 7 further comprising;

a platform positioned at a maritime site; and an autonomous recharging station established on the platform, wherein the autonomous recharging station includes a transceiver for transmitting operational data to the base station.

12. A method for installing a network system to operate a battery-powered aerial drone which comprises the steps of:

establishing a base station which includes a transceiver for receiving flight information data from the aerial drone, and a controller for using the flight information data to fly the aerial drone;

locating at least one autonomous recharging station at a preselected terrestrial site, wherein the recharging station includes a probe, a self-sustaining electricity supply source and a transmitter, wherein the probe is linked with the electricity supply source to recharge the battery of the drone when the drone is engaged with the probe, and wherein the transmitter is used for transmitting operational data to the base station regarding the present recharging capacity of the electricity supply source at the recharging station and whether another drone is currently being recharged at the recharging station; and providing a Network Operating Center (NOC) for transmitting and receiving oversight information in real time, pertinent to drone operations within the network system, to include operational state of health, weight, battery and flight endurance, and wherein the NOC is in communication with all recharging stations within the operational area, and is selectively connected with any drone via a recharging station, and any base station inside/outside the operational area, and the NOC maintains up-to-date/real time information on the condition and availability of each autonomous recharging station in the operational area, together with operational data from the autonomous recharging station, regarding the present recharging capacity of the electricity supply source and information concerning whether an aerial drone is currently being recharged.

13. The method of claim 12 wherein the drone includes a hollow, cone-shaped receptacle to establish an access pathway to the battery, and wherein the probe is cone-shaped for engagement with the receptacle to recharge the battery of the drone when the cone-shaped receptacle on the drone is engaged with the cone-shaped probe.

14. The method of claim 12 wherein the electricity supply source is selected from the group consisting of a solar panel and a wind turbine.

15. The method of claim 12 further comprising the steps of:

identifying each autonomous recharging station with an elevation and a GPS location; and providing an array having a plurality of probes mounted in the array for simultaneously accommodating a same plurality of aerial drones.

16. The method of claim 12 further comprising the steps of:

positioning a platform at a maritime site on a body of water; and erecting an autonomous recharging station on the platform, wherein the autonomous recharging station includes a transceiver for transmitting operational data to the base station.

* * * * *

UNITED STATES PATENT AND TRADEMARK OFFICE
CERTIFICATE OF CORRECTION

| | |
|---|---|
| PATENT NO. | : 10,843,819 B2 |
| APPLICATION NO. | : 16/044044 |
| DATED | : November 24, 2020 |
| INVENTOR(S) | : Desmond Wheatley and Patrick Senatore |

It is certified that error appears in the above-identified patent and that said Letters Patent is hereby corrected as shown below:

In the Specification

Column 4, Line 49 - after the word "transceiver" and before the word "which" DELETE "36" and INSERT --38--.

Column 6, Line 27 - after the word "is" and before the word "in" DELETE "riot" and INSERT --is not--.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*